(12) United States Patent
Shimbaru

(10) Patent No.: US 7,843,605 B2
(45) Date of Patent: Nov. 30, 2010

(54) COLOR PROCESSING APPARATUS AND METHOD THEREOF

(75) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/033,551

(22) Filed: Feb. 19, 2008

(65) Prior Publication Data

US 2008/0218780 A1    Sep. 11, 2008

(30) Foreign Application Priority Data

Mar. 6, 2007    (JP)    ............... 2007-056370

(51) Int. Cl.
  *H04N 1/60* (2006.01)
  *H04N 1/46* (2006.01)
  *G06K 9/00* (2006.01)

(52) U.S. Cl. ............ 358/1.9; 358/500; 358/504; 358/509; 358/518; 358/523; 382/162; 382/167; 345/589; 345/590; 345/591

(58) Field of Classification Search ............ 358/1.9, 358/500, 504, 509, 518, 523; 382/162, 167; 345/589, 590, 591, 604
See application file for complete search history.

(56) References Cited

U.S. PATENT DOCUMENTS 5,272,518 A * 12/1993 Vincent ............... 356/405
5,754,682 A    5/1998 Katoh
6,081,254 A    6/2000 Tanaka et al.
6,459,436 B1 * 10/2002 Kumada et al. ............ 345/590
6,480,202 B1   11/2002 Deguchi et al.
2002/0168103 A1  11/2002 Shiraiwa
2005/0275911 A1 * 12/2005 Yamada et al. ............ 358/518

FOREIGN PATENT DOCUMENTS

JP    09-214786    8/1997

OTHER PUBLICATIONS

All of the above references were cited in a Jun. 9, 2008 European Search Report of the counterpart European Patent Application 08003141.2.

* cited by examiner

*Primary Examiner*—Charlotte M Baker
(74) *Attorney, Agent, or Firm*—Cowan, Liebowitz & Latman, P.C.

(57) ABSTRACT

Implementation of color matching with a high accuracy between a device of luminous type and a device of non-luminous type is demanded. Hence, a combination of the device type of a source device and the device type of a destination device is discriminated. If a device of luminous type and a device of non-luminous type are combined, colorimetric values of the device of non-luminous type measured by a contact colorimeter into those of a non-contact colorimeter, and color conversion in accordance with a predetermined color matching method is performed using colorimetric values of the device of luminous type measured by the contact colorimeter and the transformed colorimetric values of the device of non-luminous type.

8 Claims, 10 Drawing Sheets

FIG. 2

APPEARANCE PARAMETER

| | | | |
|---|---|---|---|
| WP | 112 | 120 | 133 |
| $L_A$ | 24 | | |
| c | 0.59 | | |
| $N_c$ | 0.9 | | |
| F | 0.9 | | |
| $Y_b$ | 41 | | |

PRIVATE DATA
TRANSFORMATION MATRIX $$\begin{bmatrix} A & B & C \\ D & E & F \\ G & H & I \end{bmatrix}$$

— 21

23 —

COLORIMETRIC VALUE DATA — 22

| R | G | B | X | Y | Z |
|---|---|---|---|---|---|
| 0 | 0 | 0 | 2 | 3 | 2 |
| 0 | 0 | 16 | 4 | 5 | 7 |
| ⋮ | | | ⋮ | | |

FIG. 6

STEP OF R VALUE : 0, 32, 64, ....., 224, 255

STEP OF G VALUE : 0, 32, 64, ....., 224, 255

STEP OF B VALUE : 0, 32, 64, ....., 224, 255

Jab VALUE OF GRID POINT (0, 0, 0) : (30, 0, -2)
Jab VALUE OF GRID POINT (0, 0, 1) : (31, 2, -9)

⋮

Jab VALUE OF GRID POINT (0, 0, 8): (34, 18, -33)
Jab VALUE OF GRID POINT (0, 1, 0) : (34, -8, 0)

⋮

Jab VALUE OF GRID POINT (8, 8, 7) : (90, -4, 12)
Jab VALUE OF GRID POINT (8, 8, 8) : (92, 0, 0)

COLOR PROCESSING APPARATUS AND METHOD THEREOF

BACKGROUND OF THE INVENTION

1. Field of the Invention

The present invention relates to color processing of image data.

2. Description of the Related Art

With the prevalence of personal computers and work stations, desktop publishing (DTP) and computer-aided design (CAD) are widely used. In such a situation, a color reproduction technique of matching a color reproduced on a monitor by a computer with a color reproduced on a printing medium has become important. For example, DTP operates in a workflow of executing creation, editing, and modification of a color image on a monitor and then causing a color printer to print out the resultant image. In this workflow, it is demanded that the color appearance of an image on the monitor matches that of an output image of the printer.

In order to match the colors between different devices such as a monitor and a printer, a color management system (CMS) is used. A CMS includes a color management module (CMM) and a device profile. The CMS performs a color conversion process which implements color matching of an input image and an output image using a source profile corresponding to an input device and a destination profile corresponding to an output device.

FIG. 1 is a view illustrating a color conversion process from a color space (monitor RGB) of a monitor to a color space (printer RGB) of a printer. In this case, the profile of the monitor as an input device is a source profile 11, and the profile of the printer as an output device is a destination profile 12.

A CMM 10 converts image data in the monitor RGB into, e.g., Lab data in a device independent color space (DIC). Then, the CMM 10 maps the Lab data included in the monitor color gamut indicated by the source profile 11 onto the printer color gamut indicated by the destination profile 12. The CMM 10 further converts the mapped Lab data into image data in the printer RGB. That is, the CMM 10 implements color matching between different devices by performing gamut mapping in the DIC.

In many cases, the colorimetric value of a monitor is measured by bringing a colorimeter close contact with the screen so as to avoid the impact of external light. Likewise, the colorimetric value of an object, such as a printing medium which reflects light, is measured by bringing a colorimeter in close contact with the object so as to avoid the impact of external light. In general, a contact colorimeter can measure colors in a short time.

The colorimetry for a scanner or a printer is performed by measuring the reflected light from a printing medium. On the other hand, the colorimetry for a monitor is performed by measuring the light emitted from the monitor itself. A device such as a monitor is referred to as a device of luminous type, or a light-source color device since it reproduces the color using the light-source color. In contrast to a device of luminous type, a device such as a scanner or a printer is referred to as a device of non-luminous type, or an object color device since it presents a color by the reflected light, that is, it reproduces the color using the object color.

When the color conversion process illustrated in FIG. 1 is used, if both the input and output devices are the device of non-luminous type, the impact of ambient light on the viewing environment is almost the same, so that it is possible to match the colors using the colorimetric values measured by a contact colorimeter. If both the input and output devices are the device of luminous type, the impact of ambient light on the viewing environment is relatively small. Therefore, it is possible to implement color matching by using the colorimetric values measured by a contact colorimeter.

The color of an output image of a printer printed on a printing medium receives the impact of ambient light on the viewing environment, and the appearance of color changes when the ambient light changes. Therefore, when colorimetric values measured by a contact colorimeter are used in color conversion for a combination of a device of luminous type and a device of non-luminous type, e.g., a monitor as an input device and a printer as an output device, a faithful color matching result cannot always be obtained. In other words, the colorimetric value of a device of luminous type and that of a device of non-luminous type, both measured by a contact colorimeter, cannot be handled equivalently.

When a non-contact colorimeter capable of measurement including the impact of ambient light or the like is used for measuring the color of a device of non-luminous type, it is possible to handle the colorimetric value of a device of luminous type and that of a device of non-luminous type equivalently, and therefore color matching with a high accuracy can be implemented. However, non-contact colorimeters are not widely used as compared to contact colorimeters. In addition, a non-contact colorimeter requires a long measurement time, and therefore efficient color measurement is difficult.

SUMMARY OF THE INVENTION

In one aspect, a color processing apparatus comprising a discriminator arranged to discriminate a combination of a device type of a source device and a device type of a destination device, a transformer arranged to transform a colorimetric value of a contact colorimeter into that of a non-contact colorimeter, and a color converter arranged to perform color conversion using colorimetric values of the source device and colorimetric values of the destination device, wherein when the discriminator discriminates that a device of luminous type and a device of non-luminous type are combined, the transformer transforms colorimetric values of the device of non-luminous type measured by the contact colorimeter into those of the non-contact colorimeter, and the color converter performs the color conversion in accordance with a predetermined color matching method using colorimetric values of the device of luminous type measured by the contact colorimeter and the transformed colorimetric values of the device of non-luminous type.

In another aspect, a color processing apparatus comprising an input section arranged to input a profile of a source device, a profile of a destination device, and selection information for a color matching method, a determiner arranged to determine whether or not colorimetric values stored in the profile of the source or destination device to be corrected, based on a combination of device types of the source and destination devices and the selected color matching method, a transformer arranged to transform the colorimetric value stored in the profile of an object color device when the determiner determines that the correction is necessary, and a color converter arranged to perform color conversion using the transformed colorimetric values.

According to these aspects, color matching with a high accuracy can be implemented between a device of luminous type and a device of non-luminous type.

Further features of the present invention will become apparent from the following description of exemplary embodiments with reference to the attached drawings.

BRIEF DESCRIPTION OF THE DRAWINGS

FIG. 2 is a view showing an example of a device profile;

FIG. 6 is a view showing an example of the structure of a color correction LUT;

DESCRIPTION OF THE EMBODIMENTS

A color processing apparatus and method thereof of an embodiment according to the present invention will be described in detail hereinafter with reference to the accompanying drawings.

First Embodiment

Arrangement of Apparatus

Figure 1:
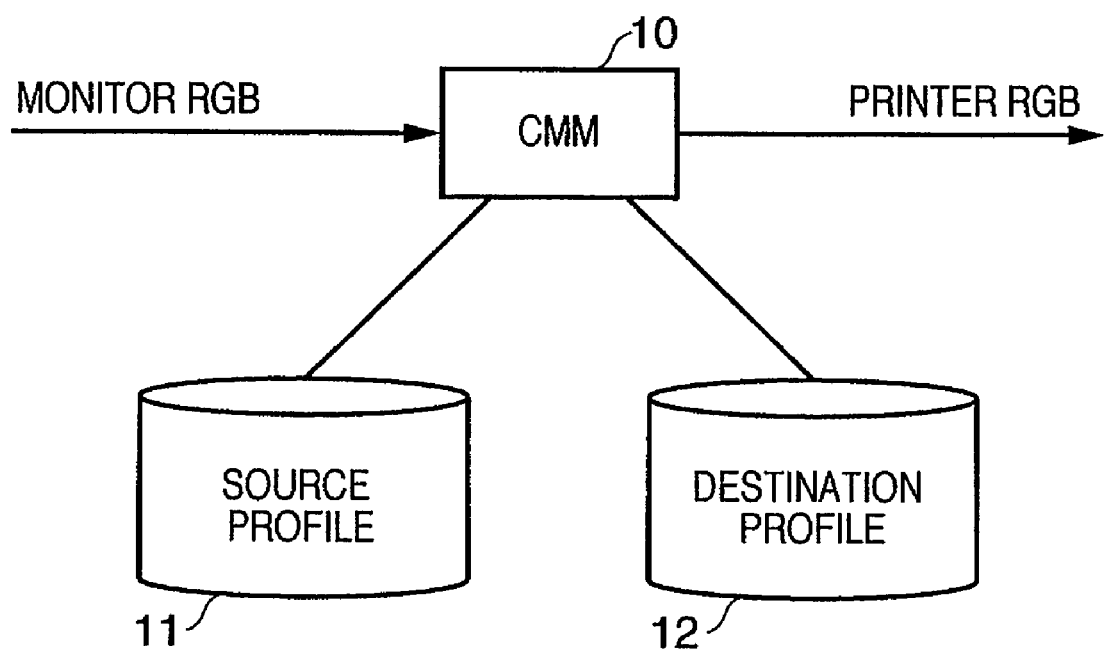
FIG. 1 is a view illustrating a color conversion process from a monitor RGB to a printer RGB.
Figure 3:
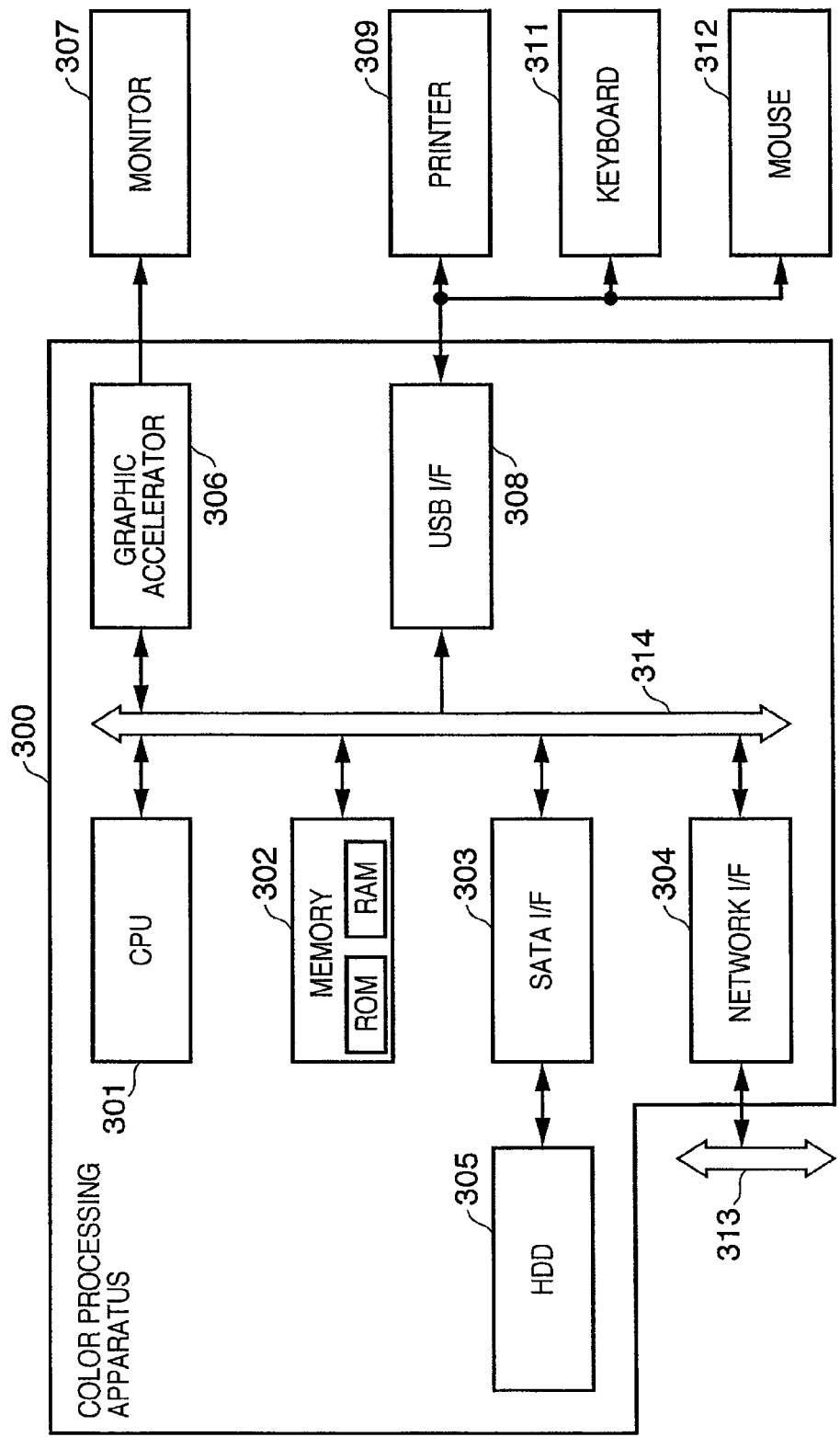
FIG. 3 is a block diagram showing the arrangement of a color processing apparatus of an embodiment.

FIG. 3 is a block diagram showing the arrangement of a color processing apparatus 300 of an embodiment.

In FIG. 3, a CPU 301 executes an operating system (OS) or program including a printer driver stored in a read-only memory (ROM) of a memory 302 and a hard disk drive (HDD) 305, by using a random access memory (RAM) of the memory 302 as a work memory. The CPU 301 executes image processing (to be described later) in accordance with a user's instruction input by a keyboard 311 or mouse 312 connected to a USB (Universal Serial Bus) interface (USB I/F) 308. The CPU 301 also controls the components (to be described later) via a system bus 314.

A serial ATA interface (SATA I/F) 303 is an interface which connects the HDD 305 to the system bus 314. A network interface 304 is an interface which connects the color processing apparatus 300 to a network 313. A graphic accelerator 306 is an interface which connects a monitor 307 to the color processing apparatus 300. An output device such as a printer 309 is connected to the USB I/F 308. An input device (not shown) such as a scanner can also be connected to the USB I/F 308.

[Operation of Apparatus]

The operation of the color processing apparatus 300 upon outputting a digital image to the printer 309 is described next.

In accordance with a user's instruction, the CPU 301 starts an image processing application stored in the HDD 305 and controls the graphic accelerator 306 to display the user interface (UI) of the image processing application on the monitor 307.

In accordance with a user's instruction via the UI, the CPU 301 loads image data stored in the HDD 305 to a predetermined area of the memory 302. The CPU 301 controls the graphic accelerator 306 to display an image represented by the image data stored in the memory 302 on the monitor 307.

Note that the image processing application to be executed by the CPU 301 and image data to be loaded by the CPU 301 are not limited to the program and data stored in the HDD 305. They may be a program and data stored in a server connected to the network 313. They may also be a program and data stored in a disk or memory card inserted to a disk drive or reader connected to the USB I/F 308. In the following description, image data to be loaded in the memory 302 is described as image data in which each of R, G, and B colors is represented by unsigned 8-bit data. However, the image data is not limited to this.

Upon receiving via the UI a user's instruction to print the image displayed on the monitor 307, the CPU 301 instructs the printer driver to print the image data stored in the memory 302. The printer driver converts RGB image data into CMYK image data in accordance with the process to be described later. Then, the printer driver transmits the CMYK image data to the printer 309 via the USB I/F 308. The printer 309 prints an image represented by the received CMYK image data on a printing medium.

[Printer Driver]

Figure 4:
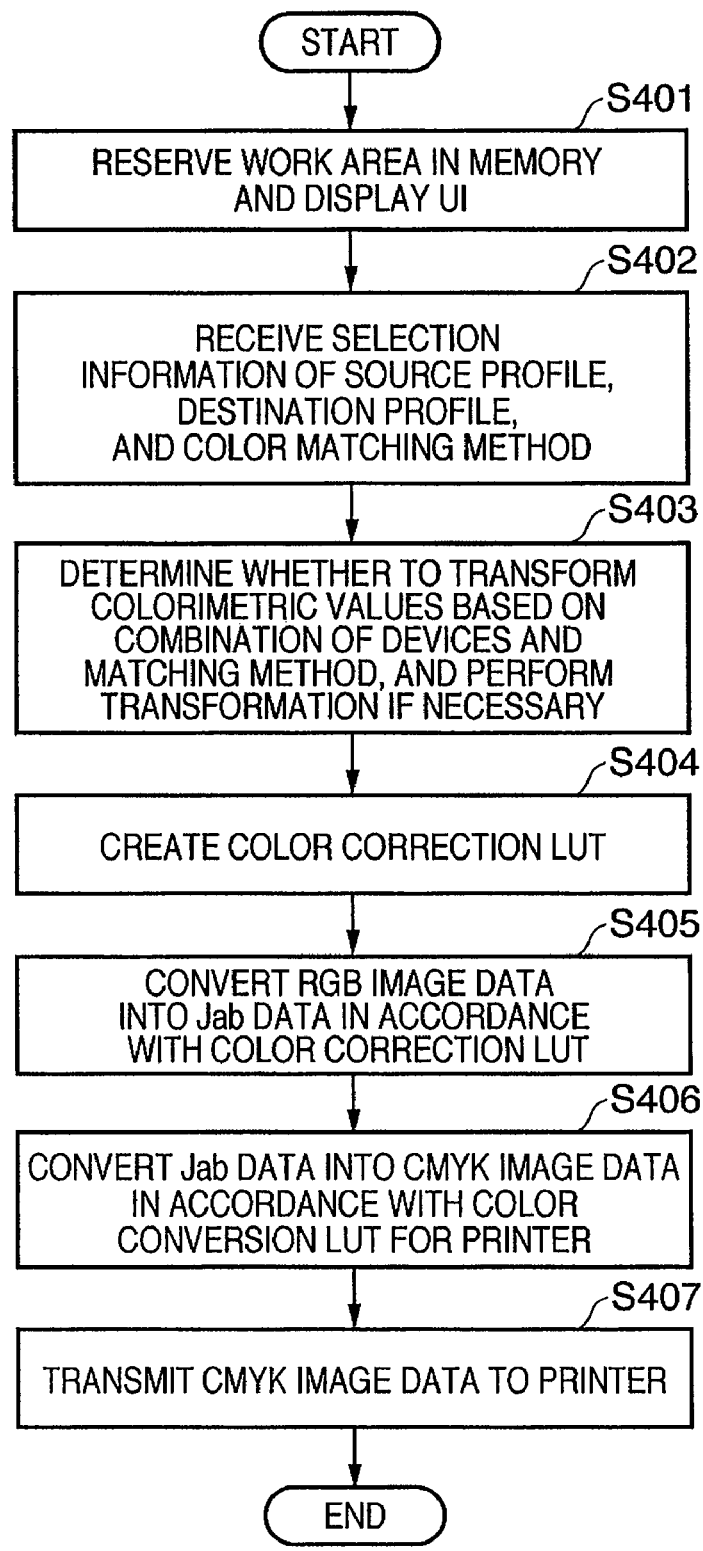
FIG. 4 is a flowchart illustrating the process of a printer driver.

FIG. 4 is a flowchart illustrating the process of the printer driver.

When printing is instructed, the printer driver reserves a work area in the memory 302 and displays a UI for color matching on the monitor 307 (S401).

Figure 5:
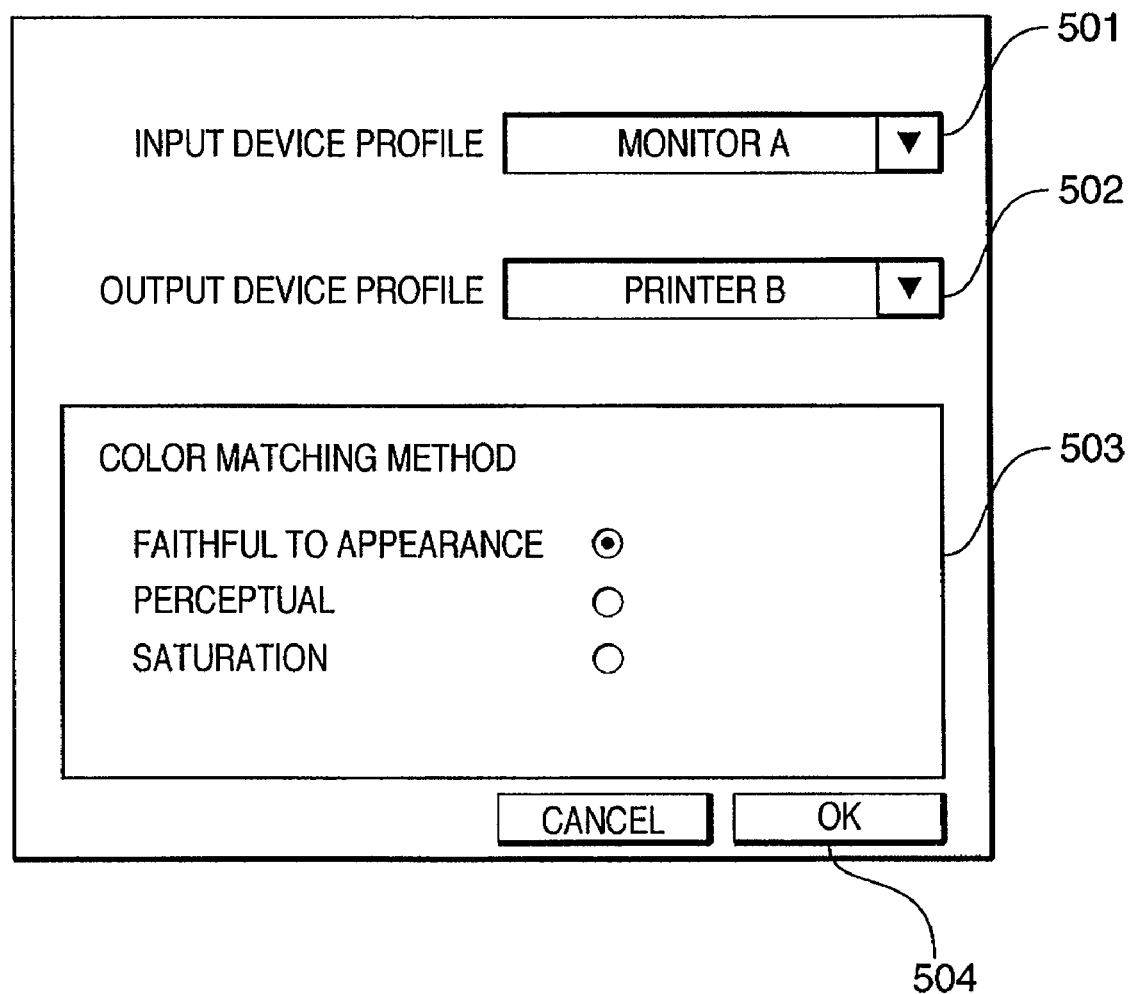
FIG. 5 is a view showing an example of a UI for color matching.

FIG. 5 is a view showing an example of the UI for color matching. This UI includes a drop-down combo box 501 for selecting a source profile, a drop-down combo box 502 for selecting a destination profile, a radio button 503 for selecting a color matching method, and the like. FIG. 5 shows "faithful to appearance", "perceptual", and "saturation" as the names of matching methods. "Colorimetric", "personal preference", "saturation preference", and the like are also available as the names of the color matching methods.

When the user operates the UI shown in FIG. 5 to select the source profile, destination profile, and color matching method and presses an OK button 504, the printer driver receives those pieces of selection information (S402).

The printer driver then determines, from the combination of the selected profiles and color matching method, whether to transform the colorimetric values stored in the profile based on the process to be described later, and transforms the colorimetric values when transformation is necessary (S403). Subsequently, the printer driver creates a color correction lookup table (LUT) (S404). Note that the details of the creation process of the color correction LUT will be described later.

FIG. 6 is a view showing an example of the structure of the color correction LUT. The color correction LUT has a data structure which describes the correspondence between the coordinate values of the grid points in the RGB color space and those of the reproduction colors in the Jab color space which correspond to the respective grid points. The data structure describes the steps (the coordinate values of the grid points) of R, G, and B values in its head part, and then describes the Jab values of the reproduction colors corresponding to the respective grid points nested in the order of RGB. Note that since the data structure of the color correction LUT describes a color distribution, the color correction LUT is sometimes referred to as color distribution data.

Next, the printer driver converts the RGB image data into fixed-point Jab data with reference to the color correction LUT and stores the converted data in the work area of the memory 302 (S405). This conversion uses, e.g., tetrahedron interpolation.

The printer driver then converts the Jab data into CMYK image data with reference to a color conversion LUT for the printer 309 and stores the converted data in the work area of the memory 302 (S406). Note that the CMYK image data is described as image data in which each of C, M, Y, and K colors is represented by unsigned 8-bit data, but the CMYK image data is not limited to this.

The printer driver transmits the CMYK image data stored in the memory 302 to the printer 309 (S407).

Transformation Process of Colorimetric Value (S403)

Figure 7:
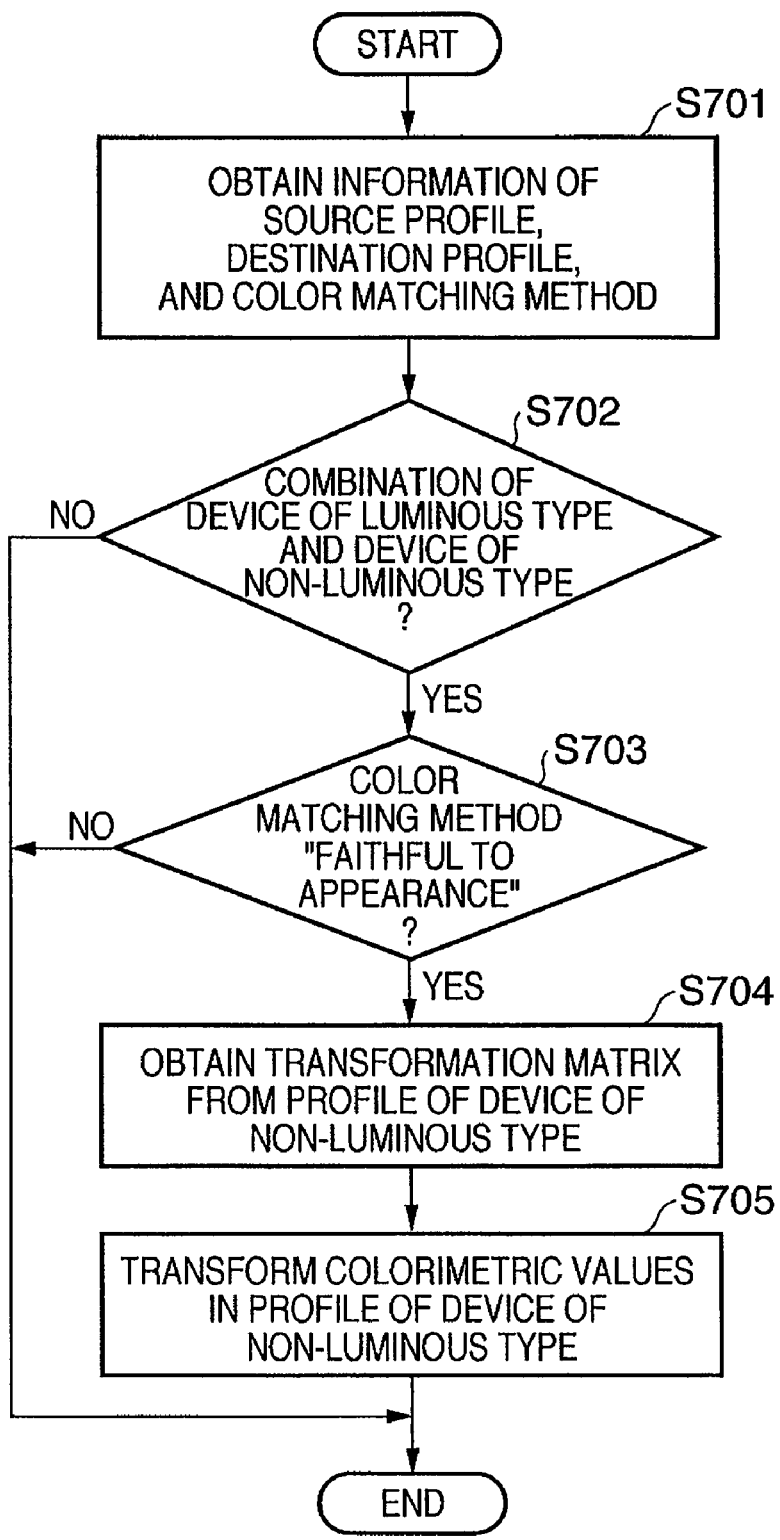
FIG. 7 is a flowchart for explaining the transformation process of colorimetric values.

FIG. 7 is a flowchart for explaining the transformation process of colorimetric values.

The printer driver obtains the information of the source profile, destination profile, and color matching method selected by the user (S701). The printer driver then determines whether the devices corresponding to the source profile and destination profile are a combination of a device of luminous type (light-source color device) and a device of non-luminous type (object color device) (S702). If NO in step S702, transformation of the colorimetric values is considered to be unnecessary, and the transformation process ends.

If YES in step S702, the printer driver determines whether "faithful to appearance" was selected as the color matching method (S703). If NO in step S703, transformation of the colorimetric values is considered to be unnecessary, and the transformation process ends.

When the color matching method is "faithful to appearance" (colorimetric), the printer driver obtains a transformation matrix which is previously stored in the profile of the device of non-luminous type (S704). The transformation matrix is transformation information of a polynomial expression which represents the correspondence relationship between the colorimetric value measured by a contact colorimeter and that measured by a non-contact colorimeter. Note that since the process for printing by the printer 309 is described herein, the transformation matrix is obtained from the printer profile (destination profile) of the device of non-luminous type. For example, when an image read by a scanner is to be displayed on a monitor, the transformation matrix is obtained from the scanner profile (source profile) of the device of non-luminous type.

FIG. 2 is a view showing an example of the device profile. The device profile consists of a header portion 21 which describes the viewing condition and the like and a device data storage portion 22 which describes the colorimetric values of the device. The profile of the device of non-luminous type in this embodiment stores a transformation matrix 23 as private data.

Next, the printer driver transforms by using the transformation matrix 23 the colorimetric values (e.g., the Lab values) (measured by the contact colorimeter) stored in the profile from which the transformation matrix 23 was obtained. The printer driver stores the transformed colorimetric values (e.g., the Lab values) in the work area of the memory 302 (S705). The transformed colorimetric values are equivalent to the colorimetric values measured by the non-contact colorimeter. The transformed colorimetric values will be referred to as a "pseudo colorimetric values", hereinafter.

Creation of Color Correction LUT (S404)

Figure 8:
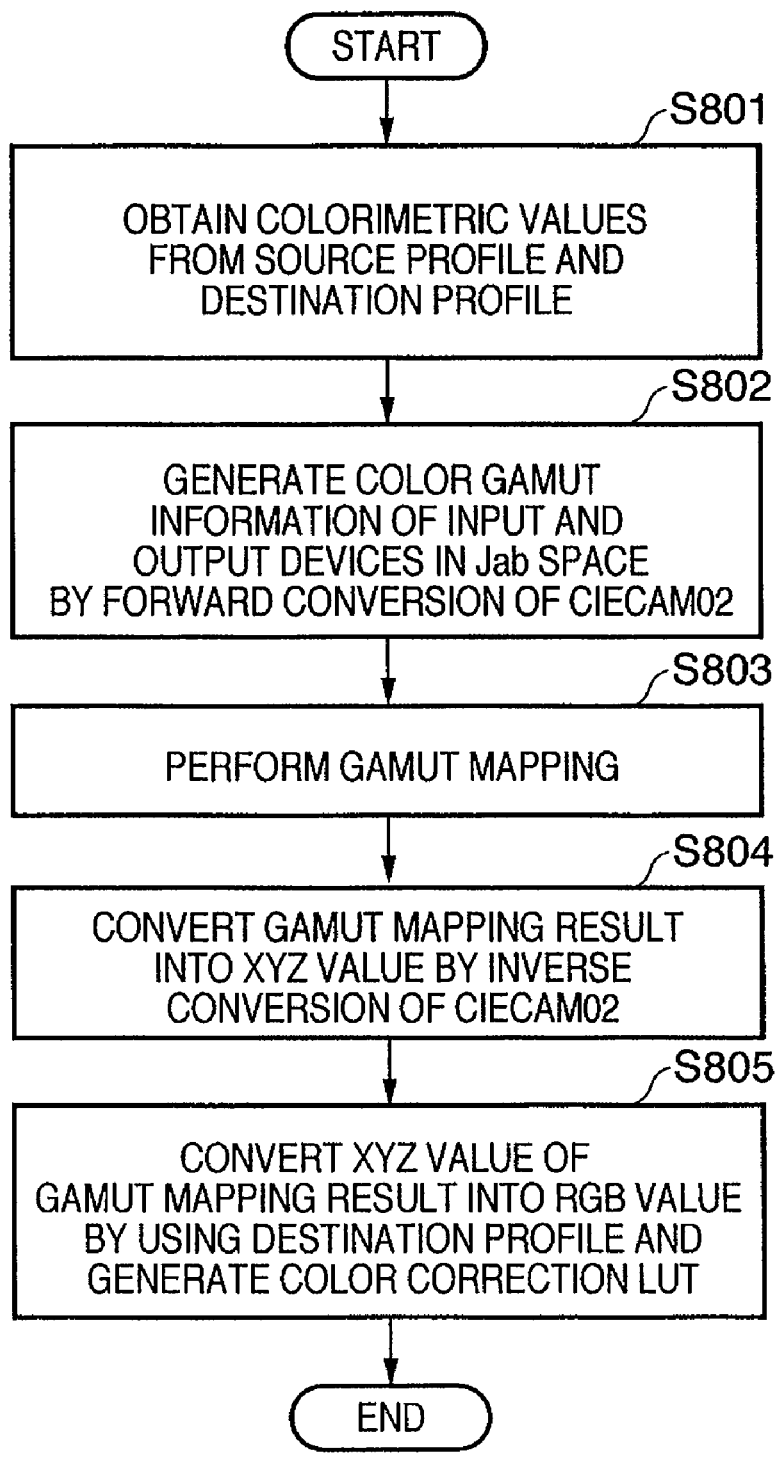
FIG. 8 is a flowchart for explaining the creation of the color correction LUT.

FIG. 8 is a flowchart for explaining the creation of the color correction LUT.

The printer driver inputs the colorimetric values of the source profile and destination profile obtained in step S701 or the pseudo colorimetric values obtained from the transformation in step S705 (S801).

Figure 9:
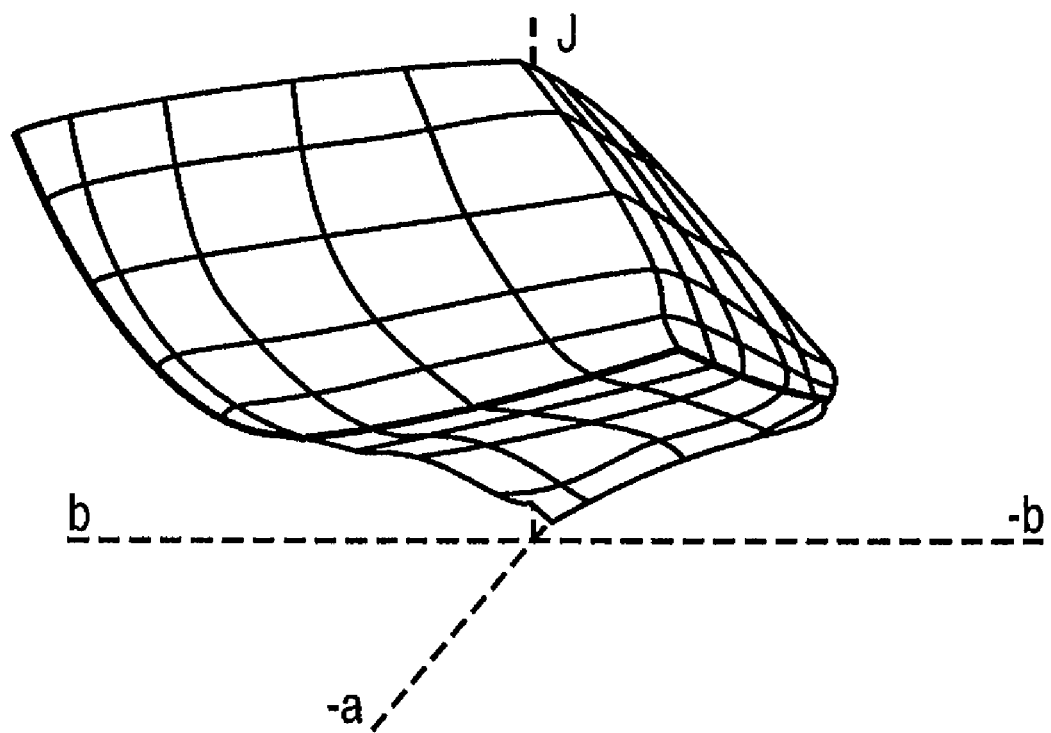
FIG. 9 is a view showing an example of color gamut information.

The printer driver performs forward conversion of CIECAM02 for the colorimetric values or pseudo colorimetric values input in step S801. In the Jab space serving as an appearance space, the printer driver generates the color gamut information of the input and output devices from the colorimetric values or pseudo colorimetric values (S802). FIG. 9 is a view showing an example of the color gamut information, in which the color gamut information is represented by a combination of a plurality of polygons.

Next, the printer driver performs gamut mapping in the Jab space for mapping the color gamut of the input device into that of the output device in accordance with the color matching method (S803). As the color matching method, e.g., a color difference minimization method is available. By inverse conversion of CIECAM02 using the appearance parameters of the destination profile (see FIG. 2), the printer driver converts the resultant Jab value of the gamut mapping into an XYZ value (S804). The printer driver further converts the resultant XYZ value of the gamut mapping into an RGB value by using the destination profile and generates the color correction LUT (S805).

Note that the appearance parameters include, as shown in FIG. 2, coordinates WP of a white point, a luminance La of the adapting visual field, a constant c indicating the impact of surround, a chromatic induction factor Nc, a factor F of the degree of adaptation, a relative luminance Yb of the background, and the like.

Generation of Color Gamut Information (S804)

Figure 10:
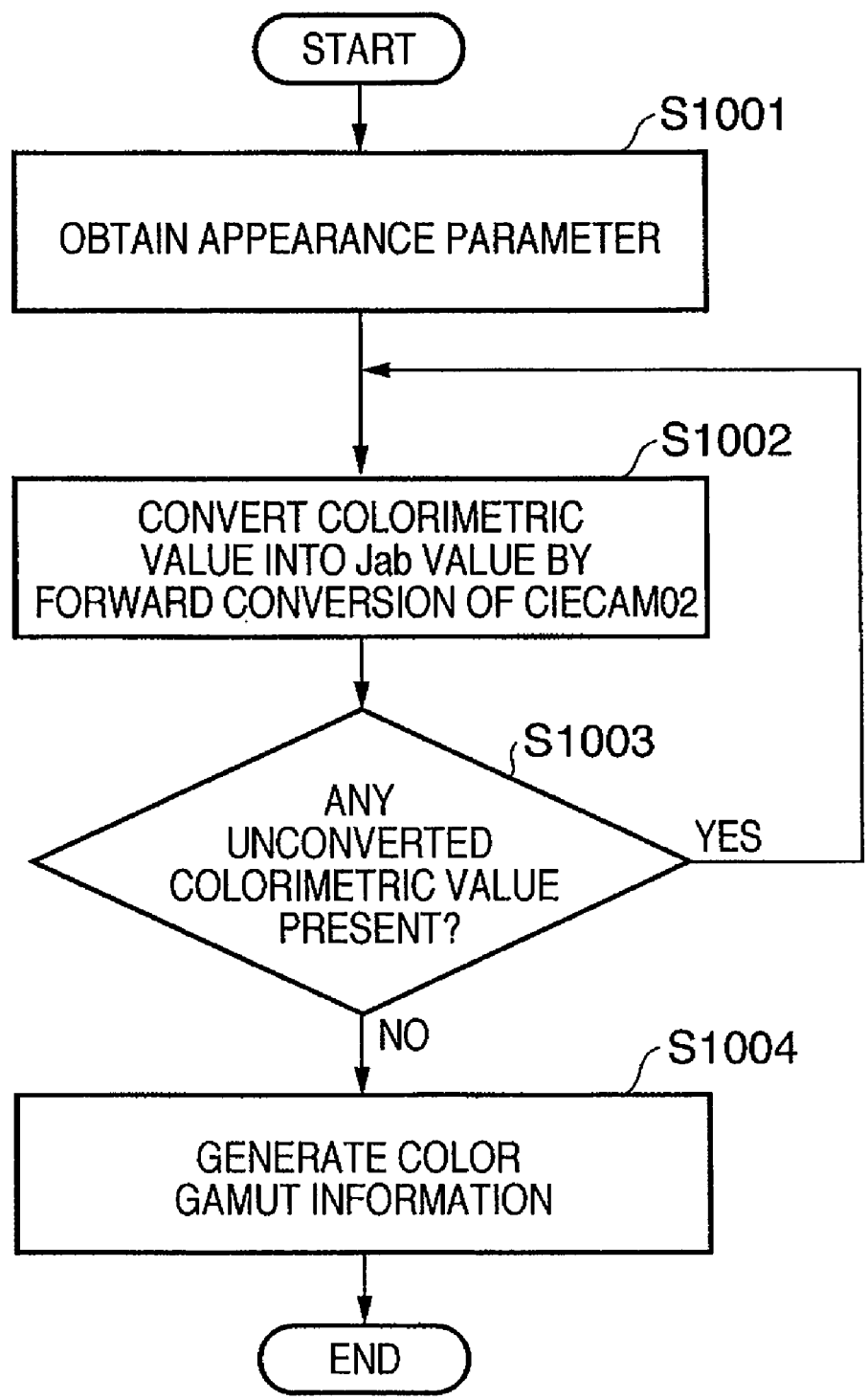
FIG. 10 is a flowchart which explains the process of generating color gamut information from colorimetric values.

FIG. 10 is a flowchart which explains the process of generating the color gamut information from the colorimetric values in the Jab space.

The printer driver obtains the appearance parameters (see FIG. 2) from the source and destination profiles (S1001) and converts one of the colorimetric values into a Jab value using forward conversion of CIECAM02 (S1002). Subsequently, the printer driver determines whether there is any colorimetric value which is not converted into a Jab value yet (S1003). If YES in step S1003, the process returns to step S1002. If NO in step S1003, the printer driver generates the color gamut information of the input and output devices in the Jab color space from the colorimetric values converted into the Jab values (S1004).

As described above, the information which describes the correspondence relationship between the colorimetric values measured by the contact colorimeter and those measured by the non-contact colorimeter is stored as the transformation matrix in the profile of the device of non-luminous type. When color conversion is to be performed for a combination of the device of luminous type and the device of non-luminous type, the color transformation matrix is used to transform the colorimetric values stored in the profile of the device of non-luminous type to generate a pseudo colorimetric values which are equivalent to the colorimetric values measured by the non-contact colorimeter. The color gamut information of the device of non-luminous type generated from the pseudo colorimetric values considers the ambient light of the viewing environment, and therefore color matching with a high accuracy is implemented. In other words, by calculating, from the colorimetric values measured by the contact colorimeter, the colorimetric values which consider the ambient light of the viewing environment without using the non-contact colorimeter, color matching with a high accuracy is implemented.

FIG. 2 shows the example in which only one transformation matrix 23 is stored in the profile. However, when a plurality of transformation matrices according to the ambient light of the viewing environment are stored in the profile and a selection function of the ambient light of the viewing environment is added to the UI shown in FIG. 5, color matching with a higher accuracy can be implemented by the transformation matrix according to the user's viewing environment.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-056370, filed Mar. 6, 2007, which is hereby incorporated by reference herein in its entirety.

What is claimed is:

1. A color processing apparatus comprising:
    a discriminator, arranged to discriminate a combination of a device type of a source device and a device type of a destination device;
    a transformer, arranged to transform a colorimetric value of a contact colorimeter into that of a non-contact colorimeter; and
    a color converter, arranged to perform color conversion using colorimetric values of the source device and colorimetric values of the destination device,
    wherein when said discriminator discriminates that a device of luminous type and a device of non-luminous type are combined, said transformer transforms colorimetric values of the device of non-luminous type measured by the contact colorimeter into those of the non-contact colorimeter, and said color converter performs the color conversion in accordance with a predetermined color matching method using colorimetric values of the device of luminous type measured by the contact colorimeter and the transformed colorimetric values of the device of non-luminous type.

2. The apparatus according to claim 1, wherein said discriminator further discriminates a kind of the color matching method, and
    wherein when said discriminator discriminates that the device of luminous type and the device of non-luminous type are combined and the color matching method is to reproduce faithful appearance, said color converter performs the color conversion using the colorimetric values of the device of luminous type measured by the contact colorimeter and the transformed colorimetric values of the device of non-luminous type.

3. The apparatus according to claim 1, wherein a transformation condition used by said transformer is stored in a profile of the device of non-luminous type with the colorimetric values of the contact colorimeter.

4. The apparatus according to claim 3, wherein the transformation condition has a matrix form.

5. The apparatus according to claim 1, wherein said color converter performs the color conversion in accordance with a viewing condition.

6. The apparatus according to claim 1, wherein when said discriminator discriminates that the devices of luminous type are combined or the devices of non-luminous type are combined, said transformer does not perform the transformation.

7. A non-transitory computer-readable medium storing a computer executable program for causing a computer to implement a color processing apparatus according to claim 1.

8. A color processing method comprising the steps of:
    discriminating a combination of a device type of a source device and a device type of a destination device;
    transforming a colorimetric value of a contact colorimeter into that of a non-contact colorimeter; and
    performing color conversion using colorimetric values of the source device and colorimetric values of the destination device,
    wherein when the discrimination step discriminates that a device of luminous type and a device of non-luminous type are combined, the transformation step transforms colorimetric values of the device of non-luminous type measured by the contact colorimeter into those of the non-contact colorimeter, and the color-conversion step performs the color conversion in accordance with a predetermined color matching method using colorimetric values of the device of luminous type measured by the contact colorimeter and the transformed colorimetric values of the device of non-luminous type.

* * * * *